United States Patent

Otsuka et al.

[11] Patent Number: 5,880,574
[45] Date of Patent: Mar. 9, 1999

[54] CONTROL SYSTEM FOR ELECTRIC VEHICLE

[75] Inventors: Kazuo Otsuka; Hisahiro Ito; Sadao Shinohara; Yasumichi Ohnuki; Fumio Anraku; Shinji Yoshikawa, all of Wako, Japan

[73] Assignee: Honda Giken Kogyo Kabushiki Kaisha, Tokyo, Japan

[21] Appl. No.: 774,783

[22] Filed: Dec. 30, 1996

[30] Foreign Application Priority Data

Dec. 29, 1995 [JP] Japan ................................. 7-353829

[51] Int. Cl.$^6$ .......................... H02P 5/41; B60L 15/08
[52] U.S. Cl. ............................. 318/811; 318/139
[58] Field of Search .................. 318/798–802, 318/807, 810, 811, 139

[56] References Cited

U.S. PATENT DOCUMENTS

| | | | |
|---|---|---|---|
| 4,461,988 | 7/1984 | Plunkett | 318/802 |
| 4,900,992 | 2/1990 | Sekizawa et al. | 318/135 |
| 5,287,051 | 2/1994 | Konrad et al. | 318/803 |

*Primary Examiner*—Bentsu Ro
*Attorney, Agent, or Firm*—Nikaido, Marmelstein, Murray & Oram LLP

[57] ABSTRACT

In an electric vehicle in which a motor is driven using the electric power of a battery, and a PWM controller controls an inverter mounted between the battery and the motor. The frequency of the PWM control means is usually set higher than an audio frequency, in order to decrease the switching noise of the inverter. Motor operational state detecting devices detect when the motor is at low speed and high-load operational state, and if there is a possibility that switching elements of the inverter may be over-heated, the frequency of the PWM controller is decreased by a frequency changing device, thereby preventing damage to the switching elements of the inverter due to the over-heating.

4 Claims, 9 Drawing Sheets

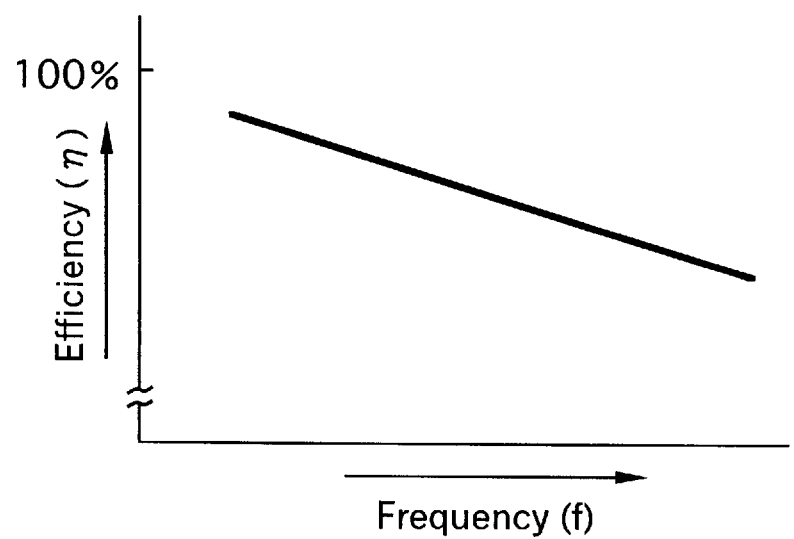

Switching element

5,880,574

CONTROL SYSTEM FOR ELECTRIC VEHICLE

BACKGROUND OF THE INVENTION

1. Field of the Invention

The present invention relates to a control system for an electric vehicle in which an AC motor is driven using electric power from a battery using a PWM control means to control an inverter mounted between the battery and the AC motor.

2. Description of the Related Prior Art

In an electric vehicle, in PWM controlling an inverter using a PWM control means, a switching noise is generated. For this reason, in a conventional electric vehicle, the generation of the switching noise is prevented by setting the frequency of the PWM control at a frequency (e.g., 20 kHz or more) higher than a frequency audible by a human.

A technique is conventionally known from Japanese Patent Application Laid-Open No. 5-115106, in which the temperature of a switching element of an inverter is detected, and when the temperature rises, the frequency of the PWM control is decreased to prevent the over-heating of the switching element.

During traveling of the electric vehicle at a low speed, the number of revolutions of the motor is small and for this reason, the timing of the switch-over of an excitation phase is retarded to prolong the time T of continuous energization of each switching element of the inverter as shown in FIG. 9. When the ON/OFF of the pulse of the PWM control is switched over, the switching element of the inverter generates heat. Therefore, when the PWM control frequency is set at a higher value, there is a possibility that the number of ON/OFF switch-over of the pulse is increased, and damage to the switching element due to the over-heating may be produced because of the prolongation of the time of continuous energization of the switching element during traveling of the vehicle at a low speed.

In this case, the following problem is encountered: even if the PWM control frequency is decreased after detection of the rising temperature of the switching element, as described in the above Patent, a sudden rise in temperature cannot be avoided because of a response retardation and hence, damage to the switching element due to the over-heating cannot be reliably prevented.

SUMMARY OF THE INVENTION

Accordingly, it is an object of the present invention to reliably prevent damage to the switching element of the inverter due to the over-heating.

To achieve the above object, according to a first aspect and feature of the present invention, there is provided a control system for an electric vehicle in which an AC motor is driven using electric power of a battery using a PWM controller for controlling an inverter mounted between the battery and the AC motor, the control system comprising: a motor operational state detecting means for detecting if the AC motor is being operated in an operational area where the speed (number of revolutions per minute) of the motor is equal to or smaller than a predetermined value and the output from the motor is equal to or larger than a predetermined value; and a frequency changing means for decreasing the frequency of the PWM control when the AC motor is being operated in the operational area.

With the first feature of the present invention, the time of continuous energization of switching elements of the inverter can be prolonged to decrease the number of switch-overs of ON/OFF of a pulse of the PWM control and thereby the exotherm of the switching elements, to reliably prevent damage to the switching elements due to over-heating.

According to a second aspect and feature of the present invention, the control system further includes an output correcting means for correcting an output from the AC motor in accordance with a change in frequency by the frequency changing means.

With the second feature of the present invention, the influence of a variation in efficiency attendant on the change in frequency can be compensated for to calculate a correct output from the AC motor.

The above and other objects, features and advantages of the invention will become apparent from the following description of the preferred embodiment taken in conjunction with the accompanying drawings.

BRIEF DESCRIPTION OF THE DRAWINGS

FIG. 6 is a graph illustrating a variation in efficiency with respect to the frequency;

DETAILED DESCRIPTION OF THE PREFERRED EMBODIMENT

The present invention will now be described by way of preferred embodiments with reference to the accompanying drawings.

Figure 1:
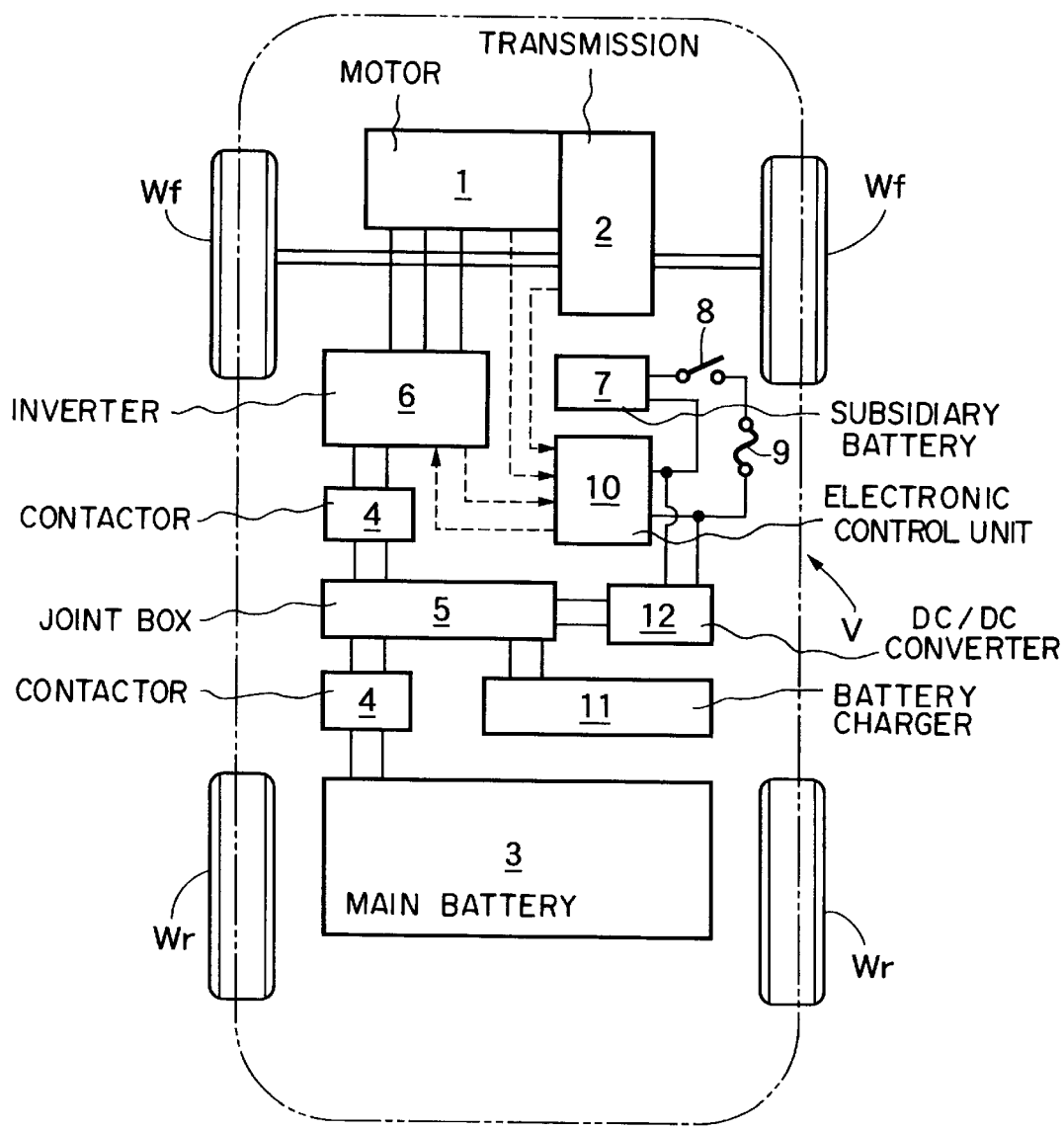
FIG. 1 is a diagrammatic illustration of the entire arrangement of an electric vehicle.
Figure 2:
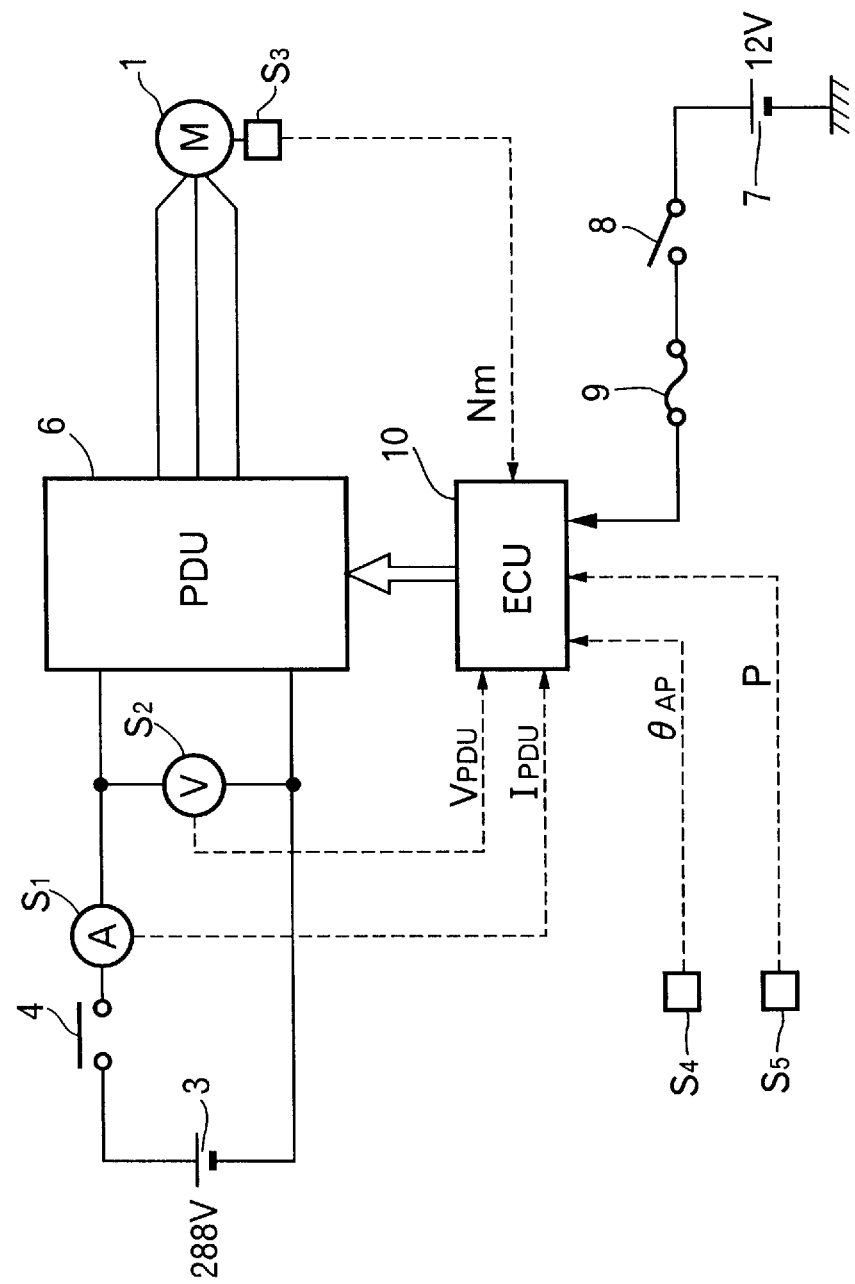
FIG. 2 is a block diagram of a control section of the present invention.

Referring to FIGS. 1 and 2, a four-wheel electric vehicle V includes a pair of left and right front wheels Wf, Wf as driven wheels to which the torque of a three-phase AC motor 1 is transmitted through a transmission 2, and a pair of left and right rear wheels Wr, Wr as follower wheels. A main battery 3, for example, of 288 volts is mounted at a rear portion of the electric vehicle V and is connected to the motor 1 through a contactor 4, a joint box 5, a contactor 4 and an inverter 6 which form the power drive unit. An electronic control unit 10 connected to a subsidiary battery 7, for example, of 12 volts through a main switch 8 and a fuse 9 is connected to the inverter 6 to control the driving torque and regenerative torque of the motor 1. A battery charger 11 and a DC/DC converter 12 are provided to charge the subsidiary battery 7 using the power of the main battery 3.

A high-voltage circuit interconnecting the main battery 3 and the inverter 6, i.e., a direct current section of the inverter 6 is provided with a current sensor $S_1$ for detecting an electric current $I_{PDU}$ of the direct current section, and a voltage sensor $S_2$ for detecting a voltage $V_{PDU}$. The electric current $I_{PDU}$ of the direct current section of the inverter 6 detected by the current sensor $S_1$ and the voltage $V_{PDU}$ of the direct current section detected by the voltage sensor $S_2$ are inputted to the electronic control unit 10. Also inputted to the electronic control unit 10 is Nm, the revolution speed of the motor detected by a motor revolution speed sensor $S_3$, an accelerator opening degree $\theta_{AP}$ detected by an accelerator opening degree sensor $S_4$ and a shift position P detected by a shift position sensor $S_5$.

The inverter 6 includes a plurality of switching elements. By inputting a switching signal to each of the switching elements from the electronic control unit 10, a DC current of the main battery 3 is converted into three-phase AC power and supplied to the motor 1 when driving the motor, and three-phase AC power generated by the motor 1 is converted into a DC power and supplied to the main battery 3 during non-driving of the motor 1 (during regenerative operation).

Figure 3:
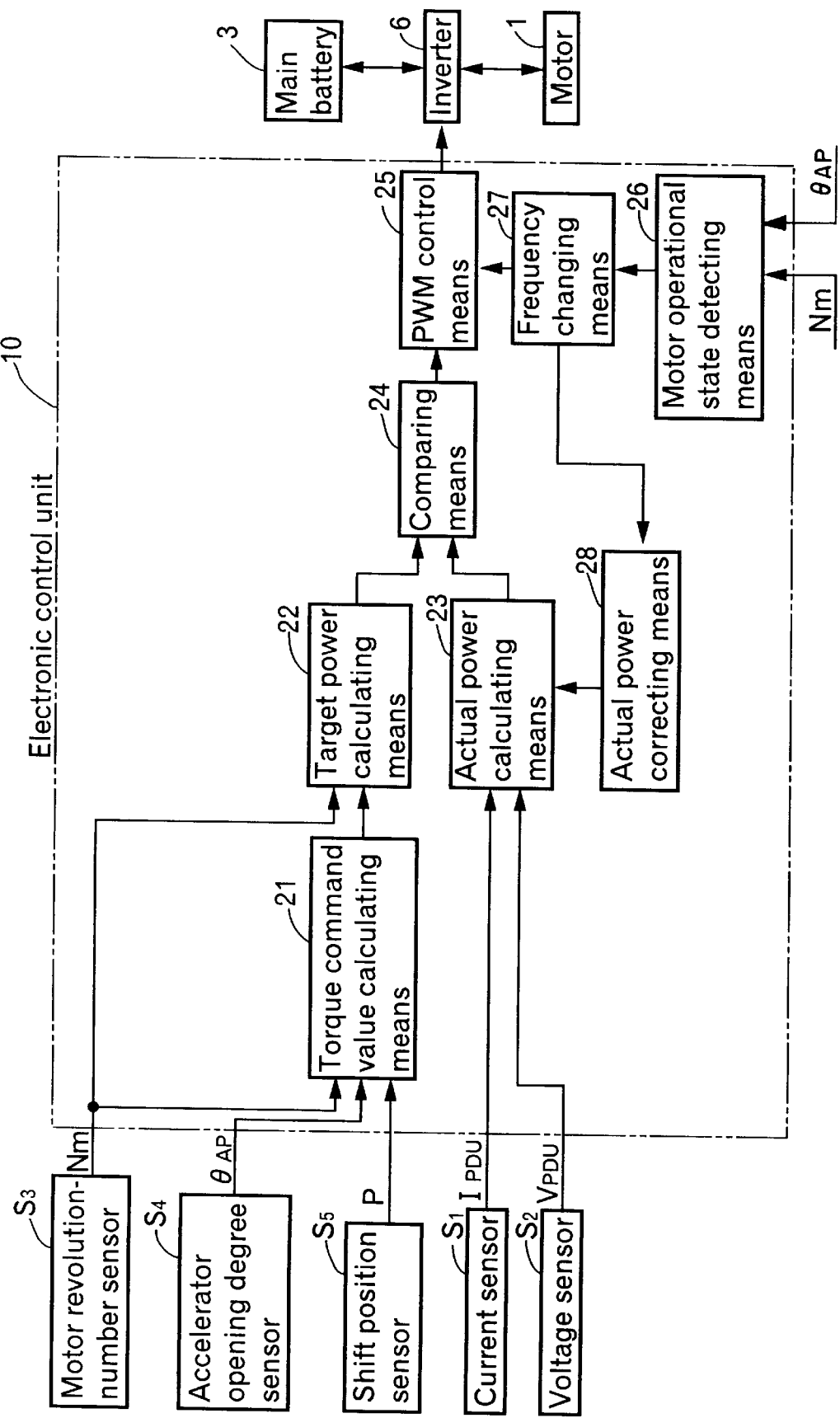
FIG. 3 is a block diagram illustrating a circuit arrangement of an electronic control unit of the present invention.

The circuit arrangement and operation of the electronic control unit 10 will be described below with reference to FIG. 3.

The electronic control unit 10 includes a torque command value calculating means 21, a target power calculating means 22, an actual power calculating means 23, a comparing means 24, a PWM control means 25, a motor operational state detecting means 26, a frequency changing means 27 and an actual power correcting means 28.

The torque command value calculating means 21 calculates a torque command value which is to be generated in the motor 1 by a driver, for example, by a map search, based on the motor revolution speed Nm detected by the motor revolution speed sensor $S_3$, the accelerator opening degree $\theta_{AP}$ detected by the accelerator opening degree sensor $S_4$ and the shift position P detected by the shift position sensor $S_5$. The target power calculating means 22 calculates a target power which is to be supplied to the motor 1 or to be taken out of the motor 1 by a regenerative operation, by multiplying the torque command value calculated in the torque command value calculating means 21 and the motor revolution speed Nm detected by the motor revolution speed sensor $S_3$ by each other. The target power may be a positive value in one case and a negative value in another case. The positive target power corresponds to the case where the motor 1 generates a driving torque, and the negative target power corresponds to the case where the motor 1 generates a regenerative torque.

The actual power calculating means 23 calculates that power portion of the actual power inputted to the inverter 6 which is to be supplied to the motor 1, by multiplying the electric current $I_{PDU}$ of the DC section of the inverter 6 detected by the current sensor $S_1$ by the voltage $V_{PDU}$ of the DC section of the inverter 6 detected by the voltage sensor $S_2$ and multiplying the resulting value by an efficiency $\eta$ (which will be described hereinafter) outputted by the actual power correcting means 28. As with the target power, the actual power may be also a positive value in one case and a negative value in another case. The positive actual power corresponds to the case where the motor 1 generates the driving torque, and the negative actual power corresponds to the case where the motor 1 generates the regenerative torque.

The target power calculated in the target power calculating means 22 and the actual power calculated in the actual power calculating means 23 are inputted to a comparing means 24, where the inverter 6 is PWM-controlled by a PWM control means 25 based on a deviation between the calculated target power and actual power. As a result, the operational state of the motor 1 is feedback-controlled to equalize the actual power to the target power.

Figure 4:
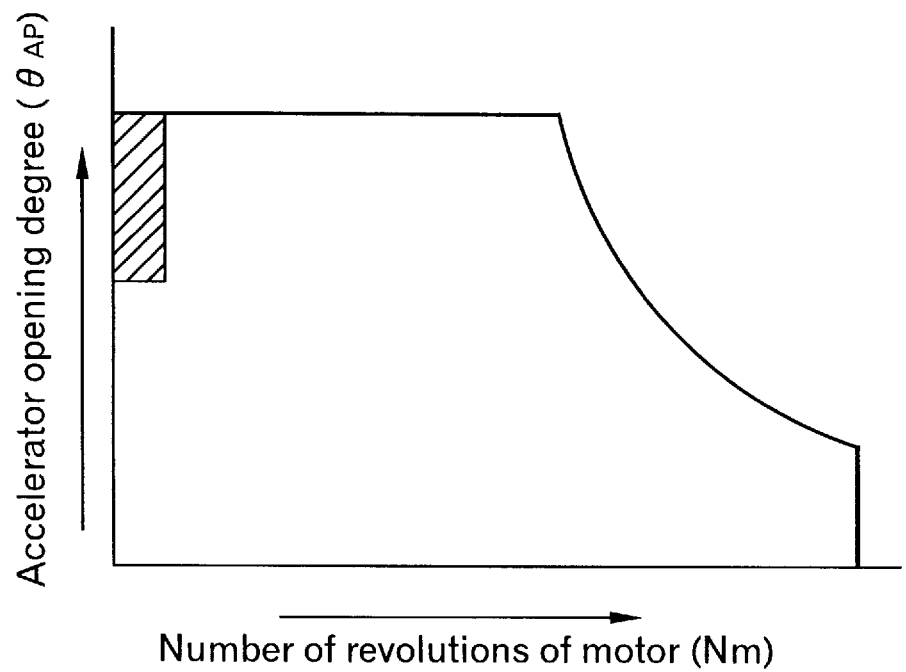
FIG. 4 is a map for determining a low speed and high-load operational state of a motor.
Figure 5A:
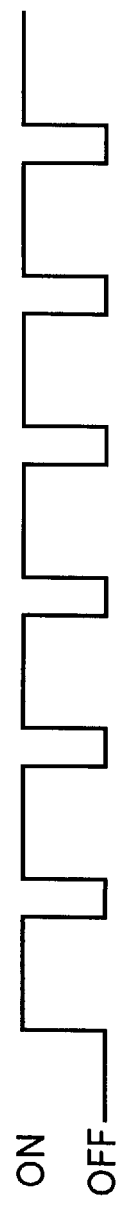
FIGS. 5A and 5B are diagrams for explaining a variation in pulse width.
Figure 5B:
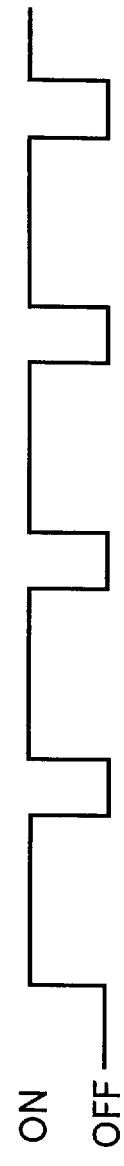

The motor operational state detecting means 26 detects an operational state of the motor 1 based on the motor revolution speed Nm detected by the motor revolution speed sensor $S_3$ and the accelerator opening degree $\theta_{AP}$ detected by the accelerator opening degree detecting means $S_4$. Specifically, the motor operational state detecting means 26 detects an operational state of the motor 1 in which the accelerator opening degree $\theta_{AP}$ is equal to or larger than a predetermined value and the motor revolution speed Nm is equal to or smaller than a predetermined value (e.g., Nm≦800 rpm) (see the obliquely lined region in FIG. 4). Such an operational state may arise when the motor revolution speed Nm is not immediately increased even if an accelerator pedal is strongly depressed, for example, when the vehicle starts to travel on a steep slope. The frequency changing means 27 changes the output frequency f from the PWM control means 25 in a decreasing direction such as from FIG. 5A to FIG. 5B if the motor 1 is in a low-speed (including a stopped state) and high-load operation state. At this time, the ratio of the ON length to the OFF length of the pulse (i.e., the duty ratio) is corrected as described hereinafter in accordance with the power conversion efficiency $\eta$ of the inverter 6 attendant on the change in frequency f.

The output frequency f from the PWM control means 25 and the efficiency $\eta$ are in a relationship shown in FIG. 6, wherein the efficiency $\eta$ is increased in accordance with a decrease in output frequency f. The actual power correcting means 28 outputs the efficiency $\eta$ to the actual power calculating means 23, and the actual power calculating means 23 calculates the actual power inputted to the inverter 6 by multiplying the current $I_{PDU}$, the voltage $V_{PDU}$ and the efficiency $\eta$ by one another.

The above-described operation will be further described below with reference to a flowchart of a main routine shown in FIG. 7.

Figure 7:
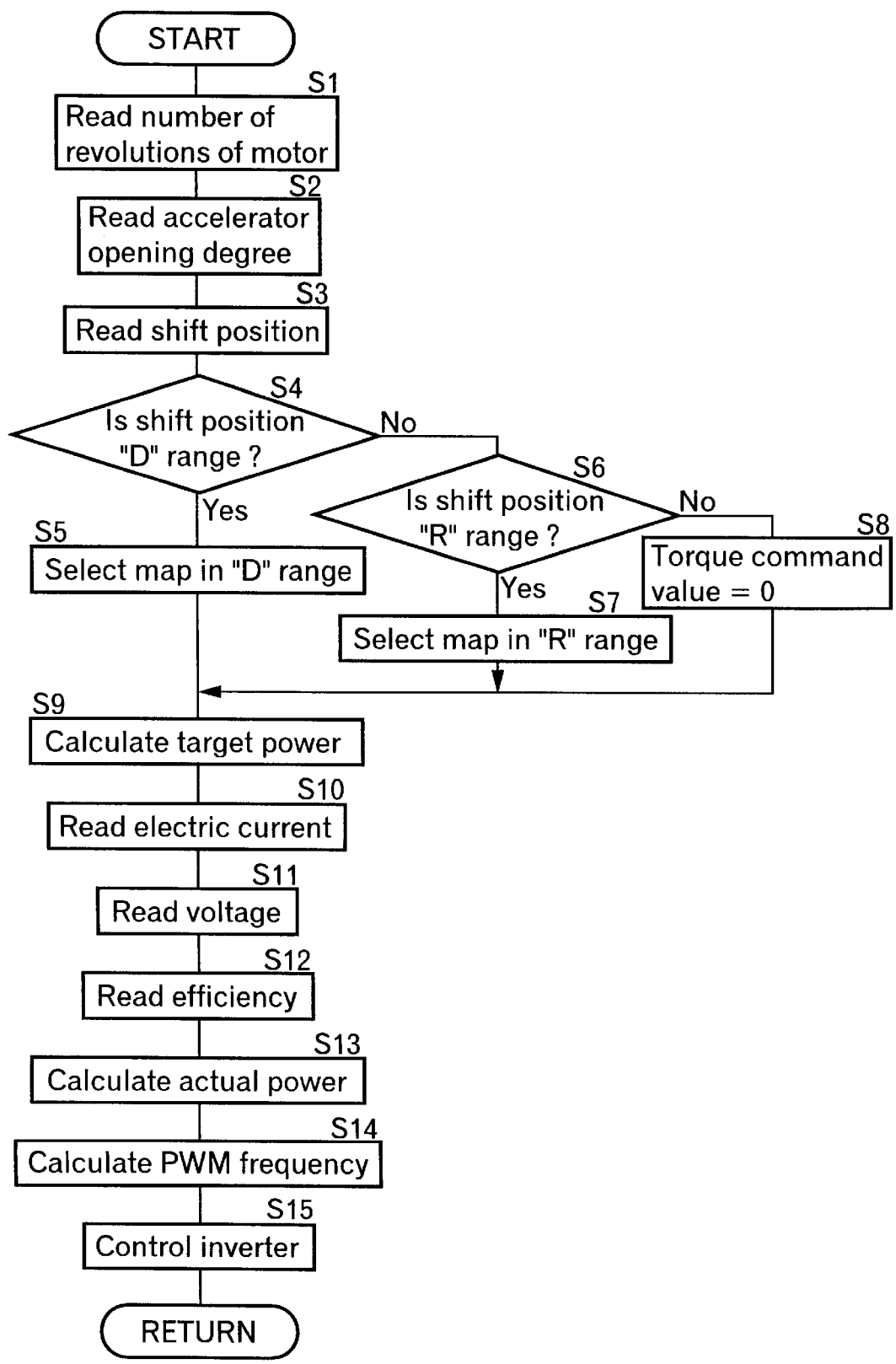
FIG. 7 is a flowchart of a main routine.

At Steps S1 to S3 of the flowchart in FIG. 7, the motor revolution speed Nm, the accelerator opening degree $\theta_{AP}$ and the shift position P are read from the motor revolution speed sensor $S_3$, the accelerator opening degree sensor $S_4$ and the shift position sensor $S_5$. If the shift position P is a drive range at subsequent Step S4, a torque map in the drive range is selected at Step S5. If the shift position P is a reverse range at Step S6, a torque map in the reverse range is selected at Step S7. If the shift position P is not the drive range nor the reverse range, i.e., if the shift position P is a neutral range or a parking range, a torque command value of 0 (zero) is selected. At Step S9, a target power is calculated by multiplying the torque map command value determined from the torque map by the motor revolution speed Nm.

Then, at Step S10, an electric current $I_{PDU}$ is read from the current sensor $S_1$ and at Step S11, a voltage $V_{PDU}$ is read from the voltage sensor $S_2$. Further, at Step S12, an efficiency $\eta$ is read from the actual power correcting means 28 and at Step S13, an actual power is calculated by multiplying the electric current $I_{PDU}$, the voltage $V_{PDU}$ and the efficiency $\eta$ by one another. At Step S14, the target power and the actual power are compared with each other, and a PWM control frequency f is calculated so that the actual power is equalized to the target power. At Step S15, the inverter 6 is subjected to the feedback control based on the frequency f to change the number of revolutions of the motor 1.

A routine for preventing the overheating of the switching elements of the inverter 6 will be described below with reference to a flowchart in FIG. 8.

First, the motor revolution speed Nm is compared with a predetermined reference value $Nm_0$ at Step S21, and the accelerator opening degree $\theta_{AP}$ is compared with a predetermined reference value $\theta_{AP0}$ at Step S22. If $\theta_{AP}<\theta_{AP0}$ at Step S22 even if $Nm \geq Nm_0$ at Step S21 or $Nm<Nm_0$ at Step S21, the motor operational state detecting means 26 determines that the motor 1 is in a usual operational state at Step S23. At this time, the frequency changing means 27 sets the frequency f of the PWM control means 25 at a frequency higher than an audio frequency (e.g., at 20 kHz or more), thereby preventing the inverter 6 from emitting a switching noise.

On the other hand, if $Nm<Nm_0$ at Step S21 and $\theta_{AP} \geq \theta_{AP0}$ at Step S22, i.e., if the speed of revolution of the motor 1 is low notwithstanding that the accelerator pedal is depressed such as at the starting of the vehicle on an upward slope, the motor operational state detecting means 26 determines that the motor 1 is in a low-speed and high-load operational state, and the frequency changing means 27 sets the frequency f of the PWM control means 25 at a value lower than the high frequency (see FIG. 5). Therefore, even if the time of continuous energization of the switching elements of the inverter 6 is prolonged due to the fact that the motor 1 is in the low-speed and high-load operational state, the number of switch-overs of the ON/OFF of the PWM control pulse can be decreased by decreasing of the frequency f, and the exotherm of the switching elements can be decreased, thereby reliably preventing damage to the switching element due to overheating.

Figure 8:
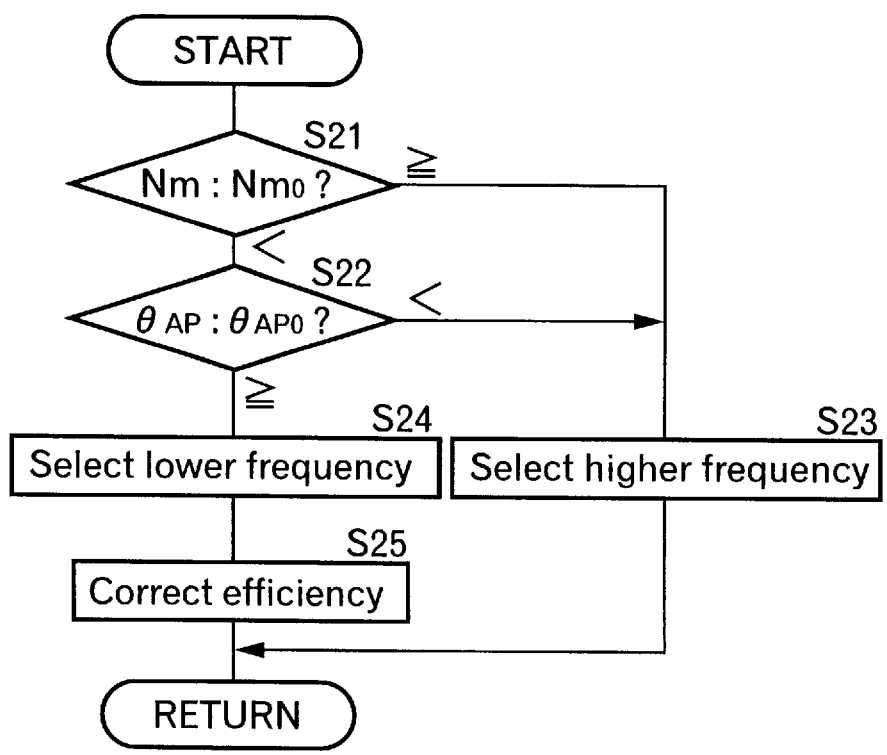
FIG. 8 is a flowchart of an over-heating preventing routine.
Figure 9:
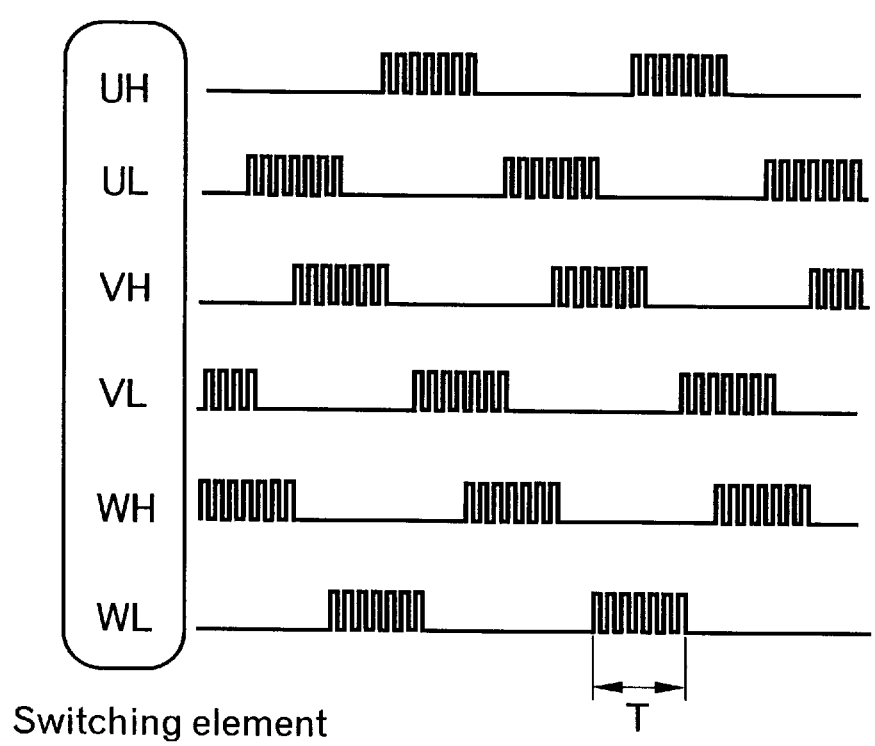
FIG. 9 is a diagram illustrating energization pattern of an inverter to switching element.

When the frequency f of the PWM control means 25 is changed at Step S24, the efficiency $\eta$ is varied in accordance with the frequency f and hence, the actual power correcting means 28 calculates an efficiency $\eta$ from the frequency f based on the map shown in FIG. 8 at Step S25. The actual power calculating means 23 calculates a correct actual power based on the efficiency $\eta$ inputted from the actual power correcting means 28, whereby an error in actual power attendant on the variation in efficiency $\eta$ can be compensated to feedback control the output from the motor 1 with greater accuracy.

In the above described embodiment, the operational state of the motor 1 is determined based on the motor revolution speed Nm and the accelerator opening degree $\theta_{AP}$, but in place of the motor revolution speed Nm, a vehicle speed equivalent thereto can be used, and in place of the accelerator opening degree $\theta_{AP}$, a target power equivalent thereto can be used.

In addition, the efficiency $\eta$ is corrected in accordance with the change in frequency f in the above-described embodiment, but the duty ratio for the PWM control means 25 to control the inverter 6 may be directly corrected in accordance with the change in frequency f. The latter method further enhances the converging property of the variation in output when the frequency f is varied. The reason is as follows: by a method for correcting the actual power by correcting the frequency f, the duty ratio is not changed at a moment when the frequency f is changed, and after it is perceived that the actual power of the motor 1 has been increased, the duty ratio is decreased by the feedback control to converge the actual power to a target power to correct the actual power. On the other hand, by the method of directly correcting the duty ratio, the actual power is corrected earlier in anticipation of an increment in actual power.

Although the embodiment of the present invention has been described in detail, it will be understood that the present invention is not limited to the above-described embodiment, and various modifications in design may be made without departing from the subject matter and scope of the invention defined in claims.

What is claimed is:

1. A control system for an electric vehicle in which an AC motor is driven using a PWM control means to control an inverter mounted between a battery and the AC motor, said control system comprising:

a motor operational state detecting means for detecting when said AC motor is operating in an operational area where a speed of revolution of the AC motor is equal to or smaller than a first predetermined value and a function of a vehicle accelerator pedal angle $\theta_{AP}$ is equal to or larger than a second predetermined value;

control means coupled to said detecting means, said control means including frequency changing means for decreasing a frequency of the PWM control means when said AC motor is operated in said operational area; and output correcting means for generating an efficiency factor which is input to the frequency changing means, said output correcting means correcting an output from said AC motor based on the efficiency factor in accordance with a change in frequency by said frequency changing means.

2. A control system for an electric vehicle according to claim 1, wherein said function of a vehicle accelerator pedal angle $\theta_{AP}$ is $\theta_{AP}$.

3. A control system for an electric vehicle according to claim 1, wherein said function of a vehicle accelerator pedal angle $\theta_{AP}$ is a target motor power.

4. A control system for an electric vehicle in which an AC motor is driven using a PWM control means to control an inverter mounted between a battery and the AC motor, said control system comprising:

a motor operational state detecting means for detecting when said AC motor is operating in an operational area where a speed of revolution of the AC motor is equal to or smaller than a first predetermined value and a function of a vehicle accelerator pedal angle $\theta_{AP}$ is equal to or larger than a second predetermined value; and control means coupled to said detecting means, said control means including frequency changing means for decreasing a frequency of the PWM control means when said AC motor is operated in said operational area, wherein said control means comprises torque command value calculating means coupled to said motor operational state detecting means, target power calculating means coupled to said torque command value calculating means, actual power calculating means, comparing means coupled to the outputs of said target power calculating means and said actual power calculating means for comparing the outputs thereof, and actual power correcting means for generating an efficiency factor, wherein an output of said frequency changing means is coupled to said actual power correcting means such that the efficiency factor is a function of the output of said frequency changing means and an output of said actual power correcting means is coupled to said actual power calculating means for modifying the output thereof by the efficiency factor, and wherein said PWM control means is coupled to the outputs of said comparing means and said frequency changing means, said PWM control means generating a control signal for controlling said inverter.

* * * * *